(12) United States Patent
Westgeest et al.

(10) Patent No.: US 10,625,918 B2
(45) Date of Patent: Apr. 21, 2020

(54) FOLDABLE AND BIODEGRADABLE CUSHIONING SHEET

(71) Applicant: Generation of Change B.V., Leiderdorp (NL)

(72) Inventors: Petrus Jacobus Anthonius Westgeest, Leiden (NL); Cornelis Jan van der Plas, The Hague (NL)

(73) Assignee: Generation of Change B.V., Leiderdorp (NL)

( * ) Notice: Subject to any disclaimer, the term of this patent is extended or adjusted under 35 U.S.C. 154(b) by 0 days.

(21) Appl. No.: 16/079,781

(22) PCT Filed: Feb. 24, 2017

(86) PCT No.: PCT/NL2017/050114
§ 371 (c)(1),
(2) Date: Aug. 24, 2018

(87) PCT Pub. No.: WO2017/146577
PCT Pub. Date: Aug. 31, 2017

(65) Prior Publication Data
US 2019/0047767 A1    Feb. 14, 2019

(30) Foreign Application Priority Data

Feb. 25, 2016 (NL) ..................................... 2016317
Sep. 23, 2016 (NL) ..................................... 2017518

(51) Int. Cl.
*B65D 81/05* (2006.01)
*B65D 65/46* (2006.01)

(52) U.S. Cl.
CPC ......... *B65D 81/056* (2013.01); *B65D 65/466* (2013.01); *B65D 2581/055* (2013.01); *B65D 2581/056* (2013.01); *Y02W 90/13* (2015.05)

(58) Field of Classification Search
USPC ................ 206/594, 591, 586, 523, 521, 453
See application file for complete search history.

(56) References Cited

U.S. PATENT DOCUMENTS

| | | | |
|---|---|---|---|
| 1,798,779 A | * | 3/1931 | Bowersock .......... B65D 5/5033 206/591 |
| 2,738,834 A | | 3/1956 | Jaffe et al. |
| 4,287,265 A | | 9/1981 | McKnight |
| 4,344,536 A | * | 8/1982 | Oberhuber .............. B29C 59/10 206/594 |
| 4,640,080 A | | 2/1987 | Wright |

(Continued)

FOREIGN PATENT DOCUMENTS

| | | |
|---|---|---|
| BE | 568999 A | 7/1958 |
| DE | 4315778 A1 | 11/1994 |

(Continued)

*Primary Examiner* — Jacob K Ackun
(74) *Attorney, Agent, or Firm* — Banner & Witcoff, Ltd.

(57) ABSTRACT

The invention is directed to a foldable and biodegradable cushioning sheet comprising a plurality of cushions, which sheet comprises a flexible base film and a plurality of cushions located on the top surface of the flexible base film; and wherein the cushioning sheet can be folded to provide a sturdy inside corner, wherein an object can be placed, such that the object is protected and if needed immobilized, for example during packing and transporting.

17 Claims, 8 Drawing Sheets

(56) References Cited

U.S. PATENT DOCUMENTS

Figure 1:
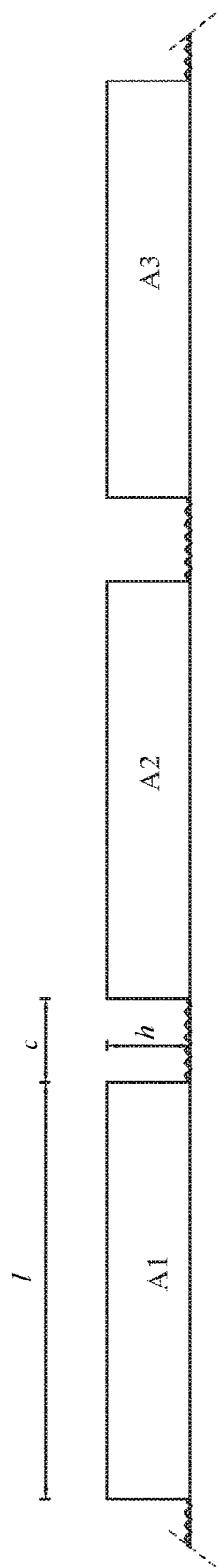

| | | | | |
|---|---|---|---|---|
| 4,953,705 A | * | 9/1990 | Evamy | B65D 5/509 |
| | | | | 206/523 |
| 5,484,063 A | * | 1/1996 | Cuccio | G11B 33/025 |
| | | | | 206/320 |
| 6,000,545 A | | 12/1999 | Smith | |
| 6,007,469 A | | 12/1999 | Jaegers et al. | |
| 6,116,423 A | * | 9/2000 | Troxtell, Jr. | B65D 5/248 |
| | | | | 206/523 |

FOREIGN PATENT DOCUMENTS

| | | |
|---|---|---|
| DE | 9321379 U1 | 8/1997 |
| DE | 102004041748 A1 | 3/2006 |
| DE | 202010008483 U1 | 11/2010 |
| DE | 102010025767 A1 | 1/2012 |
| DE | 2014001280 U1 | 4/2014 |
| EP | 0369871 A1 | 5/1990 |
| FR | 1215271 A | 4/1960 |
| FR | 2446176 A1 | 8/1980 |
| FR | 2603256 A1 | 3/1988 |
| JP | H05178372 A | 7/1993 |
| WO | 94/10063 A1 | 5/1994 |
| WO | WO 2004/113073 A1 | 12/2004 |

\* cited by examiner

5A

5B

FOLDABLE AND BIODEGRADABLE CUSHIONING SHEET

RELATED APPLICATIONS

This application is a National Stage Application under 35 U.S.C. 371 of co-pending PCT application PCT/NL2017/050114 designating the United States and filed Feb. 24, 2017; which claims the benefit of NL application number 2017518 and filed Sep. 23, 2016; and NL application number 2016317 and filed Feb. 25, 2016 each of which are hereby incorporated by reference in their entireties.

The invention is directed to a foldable cushioning sheet, a method of preparing such a sheet and a method for protecting an object using the sheet.

Cushioning material is material used to protect (or "cushion") objects during transportation. Cushioning material is designed to deform in order to help keep levels of shock and vibration below levels that may damage the object inside a container. Cushioning material is typically applied between the object to be protected and the inner wall of a container in which the object is to be transported. A further functioning of cushioning material may be to immobilize the objects in a container, e.g. by blocking the movement of the object in a container.

One of the most used materials as cushioning material are expanded foams such as expanded polystyrene (EPS) foam, expanded polypropylene (EPP) foam and expanded polyurethane (PUR) foam A disadvantage of this material is that it is not biodegradable, such that it is increasingly abundant as a form of litter in the environment.

Accordingly, there is a need for biodegradable cushioning material, which material is preferably also compostable, in order to reduce pollution of the environment.

An example of a biodegradable cushioning material is corrugated fiberboard. For example, U.S. Pat. No. 6,000,545 describes a device constructed from a substantially flat sheet of corrugated cardboard with rigid panel members, which can be folded via fold lines formed in the cardboard (called hinge members). The panel members and hinge members have a specific size and shape such that an open corner can be folded for protecting the corners and edges of packed articles within a container and the like.

However, a disadvantage of cushioning material produced from corrugated fiberboard is that the material is rigid, such that it cannot be easily folded, unless specific folding lines are provided in the fiberboard. Accordingly, it lacks versatility, as it cannot be suitably folded around many different types of objects or objects with an irregular shape.

A further disadvantage of corrugated cardboard is that the material is not a good shock-absorber in that it does not regain its original shape after impact. Thus, corrugated cardboard is often only capable of absorbing one shock, after which the object has a risk of damaging when it is subjected to a possible second shock.

Another example of biodegradable cushioning materials are natural fibers, such as plant fibers. A further example of biodegradable cushioning material is material based on expanded polylactic acid (PLA).

WO 91/17932 describes a cushioned packaging material formed of biodegradable cellulose fiber material formed into shapes. A preferred shape described herein is a cushioned packaging material utilizing biodegradable cellulose fiber in sheet form. In this form, a series of domed protuberances are disposed in relatively closely spaced relationship and interconnected by a thin wall sheet at the bases to provide a continuous sheet of domed cushioned elements so that the sheet can fold along a line between protuberances so as to be wrapped about an article to be cushioned within a package.

However, a disadvantage of natural fiber cushioning material such as described in WO 91/17932 is that it cannot provide sufficient sturdiness to hold an object in place in a container (e.g. during transportation), especially at the corners of the object. As a result, the corners are insufficiently protected from impact. Also, such material is often not capable of sufficiently retaining its shape when folded or wrapped around an object.

An object of the invention is to provide a cushioning material that does not suffer from one or more of the above disadvantages.

It is a further object of the invention to provide a biodegradable cushioning material that is both flexible, but can also provide excellent sturdiness if needed. Good sturdiness is for example required to immobilize objects and to protect heavy objects or corners of objects. Cushioning material with a combination of flexibility and sturdiness are not known in the art, because flexible material will typically result in low sturdiness.

It is in particular an object of the invention to provide a multipurpose biodegradable cushioning material which is capable of cushioning objects of any shape. For example, the cushioning material should be both capable of cushioning an object by being folded around the object, as well as being capable of immobilizing objects, e.g. by sturdily cushioning the corners of objects.

It is further an object to provide a biodegradable cushioning material that can be used to provide a sturdy protective corner wherein an object can be placed and/or immobilized.

At least one of these object has been met by providing a foldable and biodegradable cushioning sheet comprising a plurality of cushions, which sheet comprises a flexible base film (e.g. a flexible plastic base film) and a plurality of cushions (e.g. compressed fiber bundles) that are located on (e.g. attached to) the top surface of the base film, wherein the distance between adjacent cushions and the cushion height is chosen such that the sheet can be folded into a sturdy inside corner.

More in particular, the invention is directed to a foldable and biodegradable cushioning sheet comprising a plurality of cushions, which sheet comprises
 a flexible base film; and
 a plurality of cushions located on the top surface of the flexible base film, wherein each cushion optionally comprises a compressed fiber bundle and a cover film, wherein the fiber bundle may be enclosed between the base film and said cover film; and
 wherein the cushions are distributed over the top surface of the base film in a rectangular grid pattern of horizontal and vertical grid lines, with each cushion positioned on a grid point,
 wherein a fold base cushion is defined as a cushion that has a first adjacent cushion and a second adjacent cushion, which first and second cushion do not lie on the same grid line,
 wherein the cushion distance between at least one fold base cushion and its first adjacent cushion is such that the first adjacent cushion can be placed on top of said at least one fold base cushion by folding the portion of film located between these cushions upward along the side surface of said at least one fold base cushion and placing the side surface of the first adjacent cushion onto the top surface of said at least one fold base cushion, and wherein the first adjacent cushion has a cushion height sufficiently small that its top surface is not fully covered by the side surface of the first adjacent cushion after such placing; and wherein the cushion distance between said at least one fold base cushion and its second adjacent cushion is such that the side surface of the second adjacent cushion can be placed on top of the portion of base film located between said at least one fold base cushion and its second adjacent cushion, wherein such placing causes the top surface of the second cushion to be contacted with the side surface of said at least one fold base cushion, and wherein said at least one fold base cushion has a cushion height sufficiently small that the top surface of the second adjacent cushion is not fully covered by the side surface of the fold base cushion after such placing.

In case each cushion comprises a compressed fiber bundle and a cover film, the fiber bundle may or may not be enclosed between the base film and said cover film.

The cushioning sheet of the invention can be easily folded around objects due to the flexible base film. The parts of the base sheet on which no cushion is provided is easy to fold. Therefore, the cushioning sheet of the invention can be used to cushion materials of many different shapes, as well as objects with irregular shapes. A further advantage of the cushioning sheet of the invention is that it is very versatile, such that it can be used in many applications. The flexible film allows the sheet to be folded in many different ways (including, but not limited to folding it into an inside corner). Also, the film and cushions can be compressed if necessary. Accordingly, the shape and size of a single sheet can be easily adjusted. Thus, the sheet can be easily used in containers of different shapes and sizes, as well as for protecting objects of different shapes and sizes. Also, single cushions are customizable due to the method according to which the sheets can be produced (see below), which opens up even more ways to obtain a well fitting packaging sheet for any product.

Furthermore, the flexible base film has the advantage that it allows for two adjacent cushions to protect protruding parts of an object between two adjacent cushions. An even further advantage of the flexible base film is that one can fold a cushioning sheet 180° to produce a double layer of cushions. This may be desirable when wanting to fill up larger spaces or corners.

Moreover, the cushioning sheet can be used to cushion outside corners of objects and/or to immobilize objects in containers for transportation, such as a box. This is due to the presence of the fold base cushion and its adjacent cushions, which provide for a particular way in which the cushioning sheet according to the invention can be folded. The cushion distances and cushion heights are chosen such that the sheet can be folded into a sturdy inside corner (see FIGS. 7-8), wherein the side or a corner of an object can be placed. The fold base cushion as defined above provides the basis of the inside corner. The fold base cushion can be stationary, while its first adjacent cushion and second adjacent cushion are folded into position (see FIGS. 1-4 and 7-8). The inside corner may be used to protect an object, in particular in a transportation container such as a box.

Accordingly, the invention further relates to a method for protecting an object by folding the cushioning sheet into an inside corner, which method comprises the steps of
assigning a folding base cushion, which may remain stationary during folding, as well as the folding base cushion's first and second adjacent cushion, which are to be folded;
placing the first adjacent cushion on top of the folding base cushion by folding the portion of film located between the folding base cushion and the first adjacent cushion upward along the side surface of the folding base cushion and placing the side surface of the first adjacent cushion onto the top surface of the folding base cushion (first folding step); and
folding a side surface of the second adjacent cushion onto the portion of base film located between the fold base cushion and the second adjacent cushion and placing the top surface of the second adjacent cushion against the side surface of the fold base cushion (second folding step).

The folding mechanism is further explained in the Figures, which are discussed below.

The inside corner thus folded can be placed in a container and an object can be protected and/or immobilized by placing at least part of the object in the inside corner. When such a folded sheet is placed in the inside corner of a container, especially in an inside corner of a container, the folded sheet will not easily unfold. The first adjacent cushion can be kept in place by the container wall, such that it will not easily slip off the fold base cushion. Further, the second adjacent cushion can be pressed between the container wall and the fold base cushion. Due to the presence of the flexible film (especially the film in between the folded cushions), additional strength can be provided to the inside corner. The flexible film connecting the different cushions is relatively short and must be folded relatively tight along the cushions in case of an inside corner, such that the movement of the cushions in the inside corner is restricted. For example, the first adjacent cushion in the folded corner cannot move sideways, upwards or slide off the fold base cushion in the corner folded state. Accordingly, when the fold base cushion of a folded cushioning sheet is immobilized in the container (e.g. by clasping it in between the product and the container wall), the first and second adjacent cushions are also effectively immobilized. Thus, the cushioning sheet is able to provide a rigid and sturdy inside corner in a container.

FIG. 1 shows a side view of a part of a cushioning sheet according to an embodiment of the invention. The cushion distance c between cushions A1 and A2 is indicated in the figure, as well as the cushion length l of cushion A1 and the cushion height h of the cushions. The cover film that may be present in between the cushions is indicated with a zigzag line, while the base film is indicated with a straight line. Each cushion in the embodiment depicted in this Figure has the same width, length and height. The cushion distance is also the same for each set of adjacent cushions.

Figure 2:
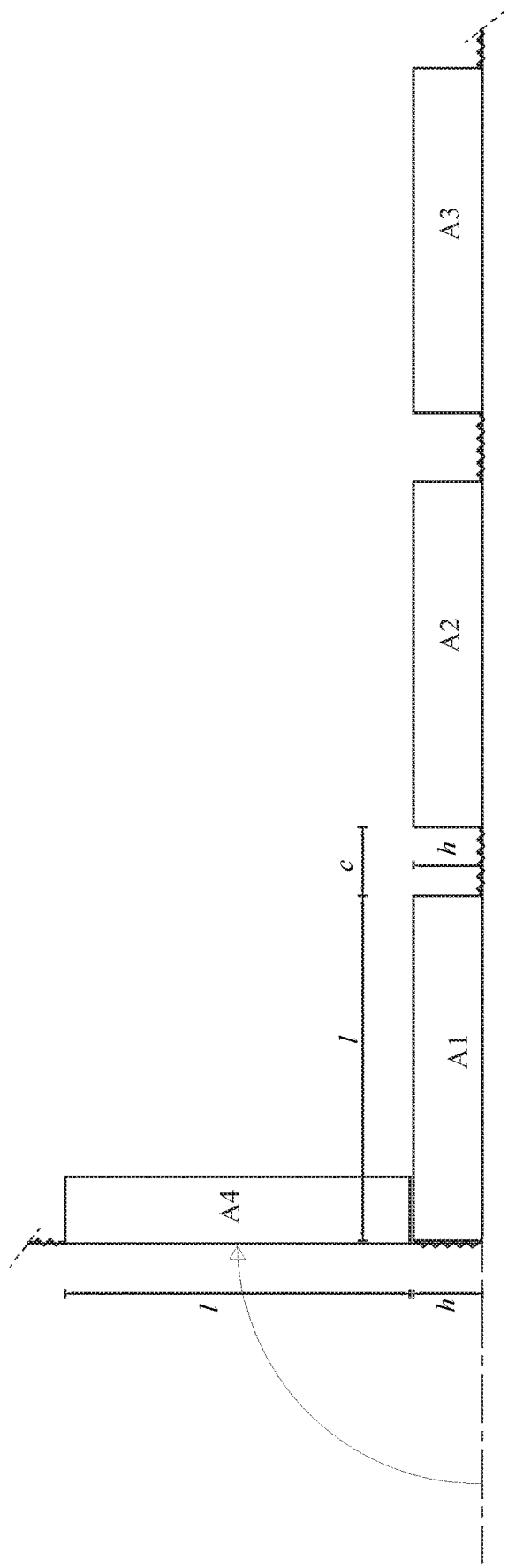

FIG. 2 shows a side view of a part of a cushioning sheet according to an embodiment of the invention, wherein the side surface of cushion A4 is folded onto the top surface of cushion A1. The cushion distance c between cushions A1 and A2 is indicated in the figure, as well as the cushion length l of cushion A1, the cushion height h of cushion A1 and the cushion distance c between cushions A1 and A2. The cover film that may be present in between the cushions is indicated with a zigzag line, while the base film is indicated with a straight line. Each cushion in the embodiment depicted in this Figure has the same width, length and height. The cushion distance is also the same for each set of adjacent cushions.

Figure 3:
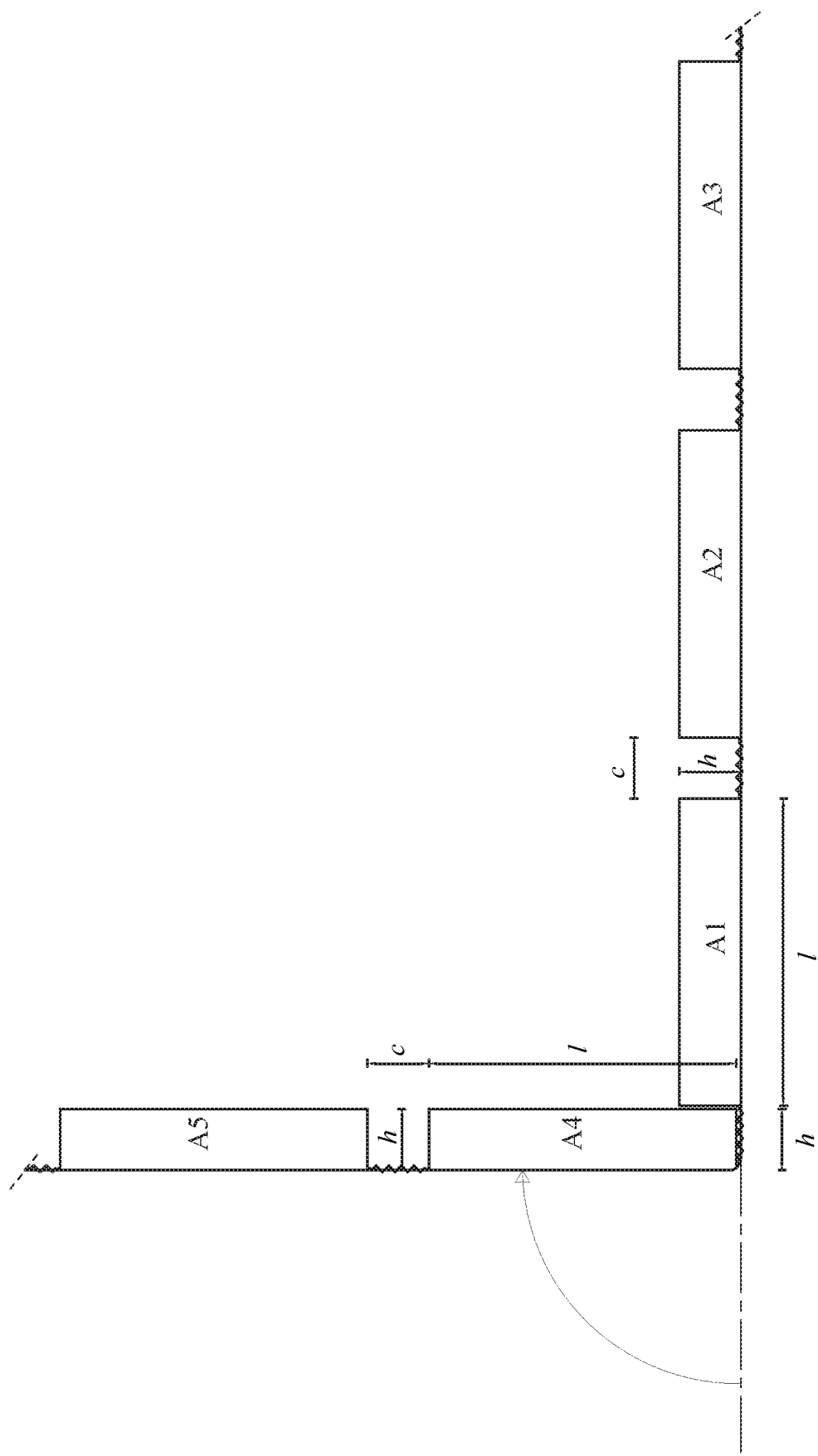

FIG. 3 shows a side view of a part of a cushioning sheet according to an embodiment of the invention, wherein cushion A4 has been folded onto the portion of the base film connecting cushions A1 and A4. The cushion distance c between cushions A1 and A4 is indicated in the figure, as well as the cushion length l of cushion A4 and the cushion height h of cushions. The cover film that may be present in between the cushions is indicated with a zigzag line, while the base film is indicated with a straight line. Each cushion in the embodiment depicted in this Figure has the same width, length and height. The cushion distance is also the same for each set of adjacent cushions.

Figure 4:
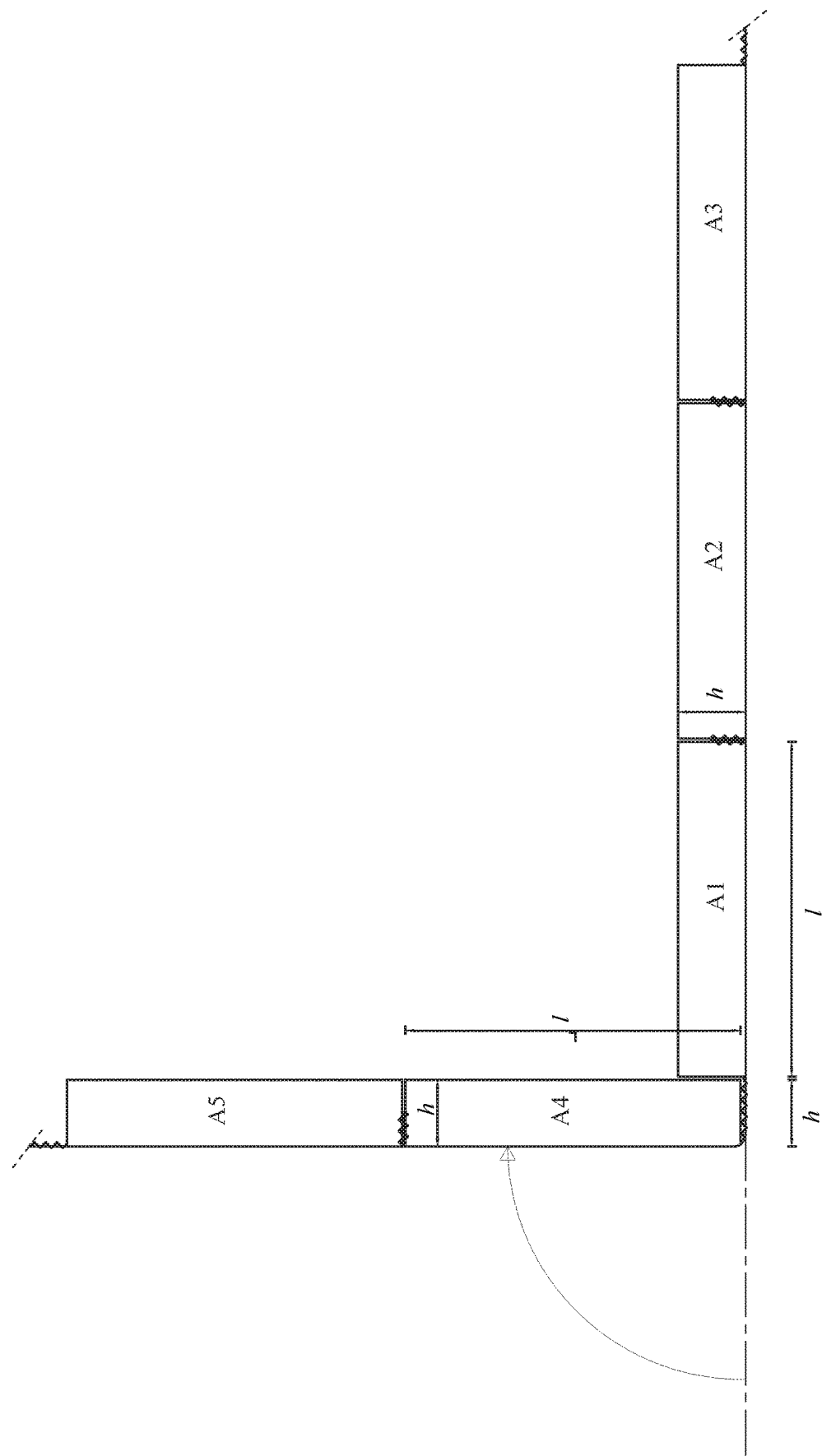

FIG. 4 shows a side view of a part of a cushioning sheet according to an embodiment of the invention, wherein cushion A4 has been folded onto the portion of the base film connecting cushions A1 and A4. The cushions in FIG. 4 have been pressed against each other, which is possible due to the flexibility of the base film (and cover film if present). Each cushion in the embodiment depicted in this Figure has the same width, length and height. The cushion distance is also the same for each set of adjacent cushions.

Figure 5:
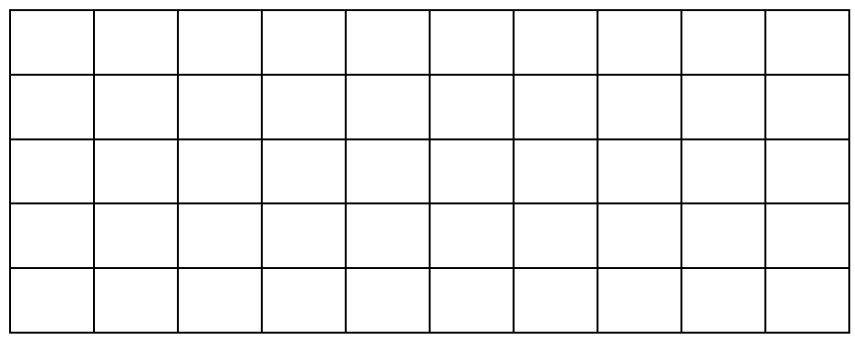
Figure 5:
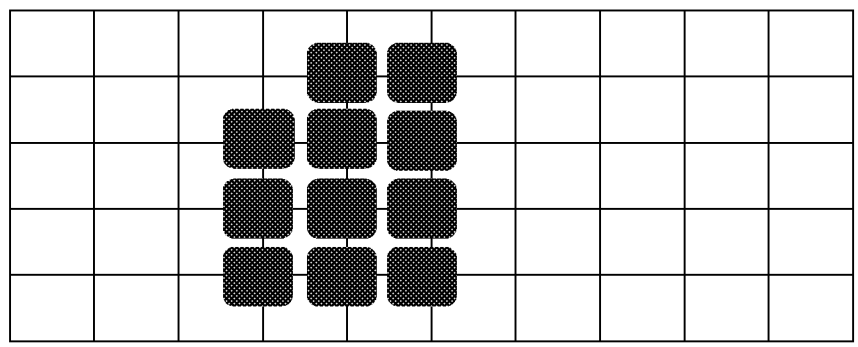

FIG. 5A shows an example of a rectangular grid pattern. FIG. 5B shows an embodiment of the sheet wherein 11 cushions have been distributed over the rectangular grid pattern.

Figure 6:
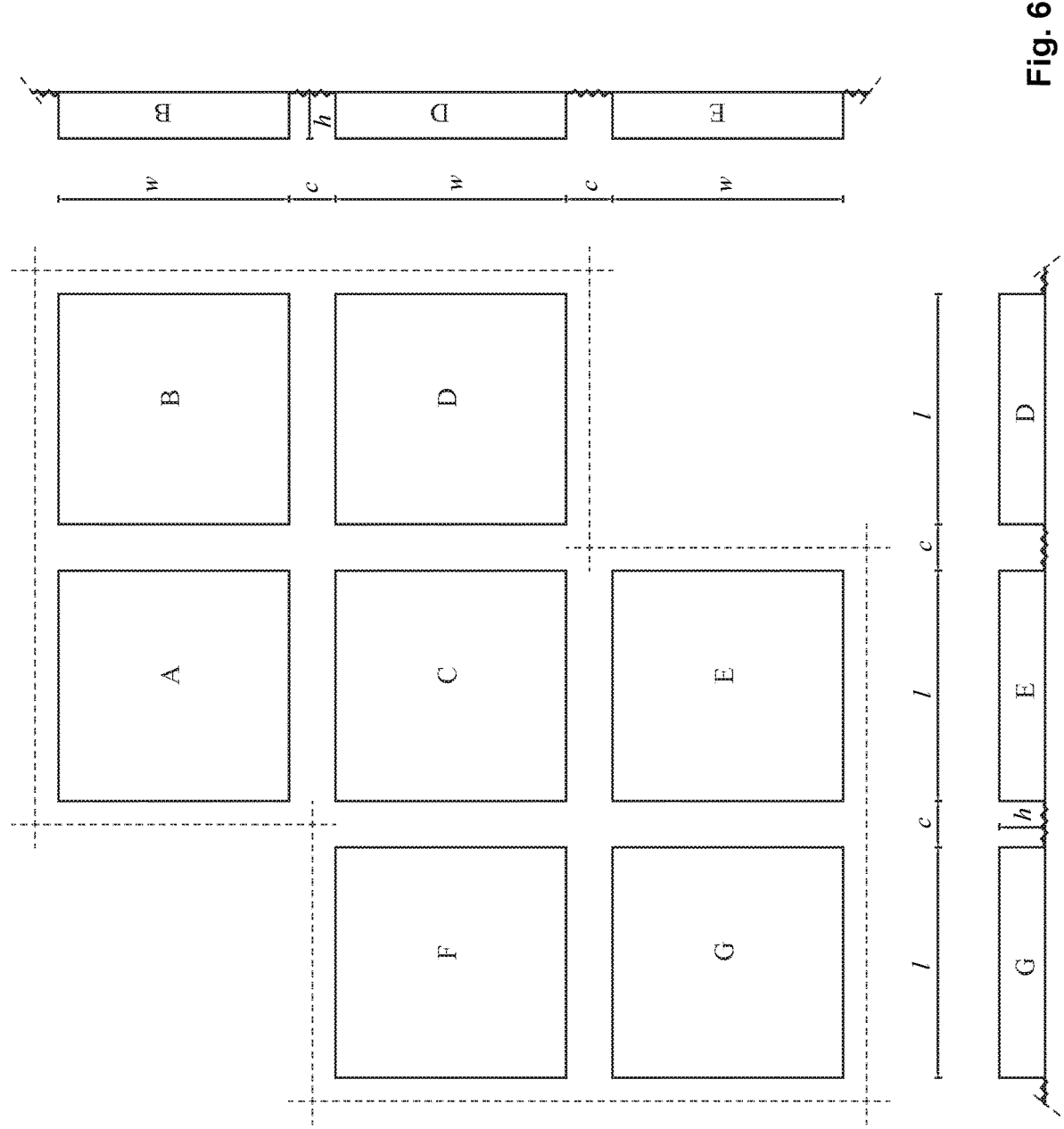

FIG. 6 shows a top view of a cushioning sheet according to an embodiment of the invention in an unfolded state. Each cushion in the embodiment depicted in this Figure has the same width, length and height (h). The width (w) is equal to the length (l) and are in the Figure both indicated by l. The cushion distance (c) is also the same for each set of adjacent cushions. On the bottom and right side of FIG. 6, a side view of the cushioning sheet is given. The outer dotted line in the figure depicts the base film.

Figure 7:
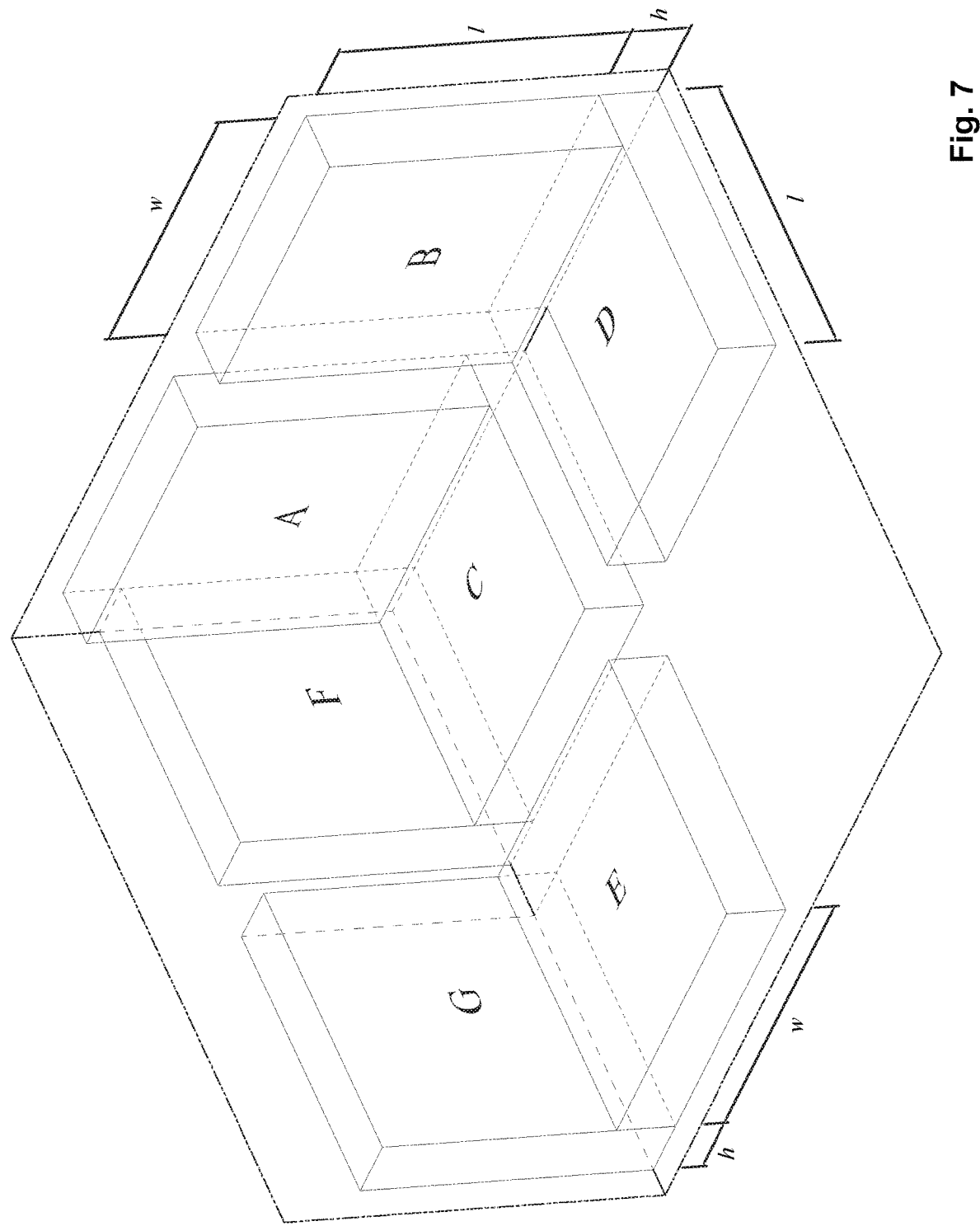

FIG. 7 shows a cushioning sheet according to an embodiment of the invention, which is folded into an inside corner. The first adjacent cushion A is folded onto the top surface of fold base cushion C, while the second adjacent cushion F is folded onto the intercushion film located between cushions F and C. Thus, cushions A, C and F form an inside corner. Each cushion in the embodiment depicted in this Figure has the same width (w), length (l) and height (h). The cushion distance is also the same for each set of adjacent cushions. The outer dotted line in the figure depicts the base film.

Figure 8:
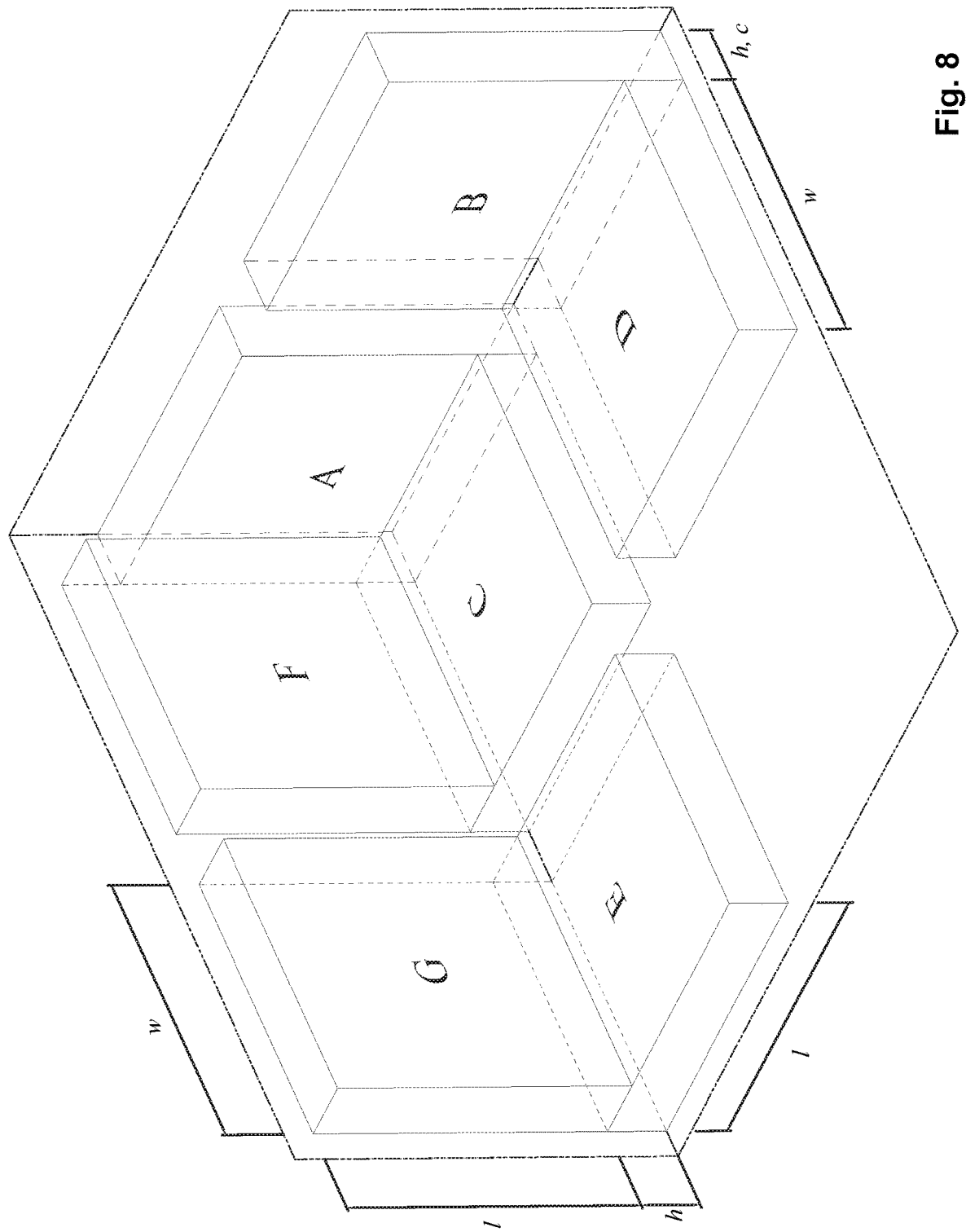

FIG. 8 shows a cushioning sheet according to an embodiment of the invention, which is folded into an inside corner. The cushioning sheet is the same as the one depicted in FIG. 7, but the folding steps are conducted in a different order. The first adjacent cushion F is folded onto the top surface of fold base cushion C, while the second adjacent cushion A is folded onto the intercushion film located between cushions A and C. Thus, cushions A, C and F form an inside corner. Each cushion in the embodiment depicted in this Figure has the same width (w), length (l) and height (h). The cushion distance is also the same for each set of adjacent cushions. The outer dotted line in the figure depicts the base film.

The term "fold base cushion" is defined as a cushion that has a first adjacent cushion and a second adjacent cushion, which first and second cushion do not lie on the same grid line. Accordingly, the fold base cushions and its first and second adjacent cushion lie in a (two-dimensional) corner on the cushioning sheet.

The term "cushion row" is defined herein as a row of cushions positioned on one of the grid lines of the rectangular grid pattern. In case a cushion row is positioned on a horizontal grid line, it may be referred to as a horizontal cushion row. In case a cushion row is positioned on a vertical grid line, it may be referred to as a vertical cushion row.

The term "rectangular grid pattern" refers to a pattern composed of a first series of parallel lines and a second series of parallel lines, wherein the lines of the second series are perpendicular to the lines of the first series. The lines are called grid lines. The lines of one of the two series are called horizontal grid lines; the lines of the other series are called vertical grid lines. The intersection point of two lines is called a grid point. The distance between any two adjacent lines in a series is the same. In a preferred embodiment, the rectangular grid pattern is a square grid pattern. In a square grid pattern, the distance between any two adjacent lines in the first series is the same as the distance between any two adjacent lines in the second series. Regarding the orientation of the pattern, the rectangular grid pattern should be chosen to lie in the plane of the unfolded base film. Which direction in the cushioning sheet is chosen as horizontal and which direction as vertical is not important.

The "cushion distance" between two adjacent cushions is defined as the shortest distance between the two adjacent cushions, measured in the plane of the top surface of the unfolded base film. The cushion distance is either measured parallel to the horizontal grid lines of the rectangular grid pattern (in case the adjacent cushions lie on a horizontal cushion row) or parallel to the vertical grid lines of the rectangular grid pattern (in case the adjacent cushions lie on a vertical cushion row). Two cushions are in particular considered adjacent if they lie on the same gridline and are positioned on adjacent grid points.

The "cushion height" is defined as the longest distance passing through the interior of the cushion (made up by the cushioning material), wherein the distance is measured perpendicular to the grid lines. In other words, the "cushion height" of a certain cushion refers to the longest distance between the cushion top (including the cover film if present) and the top surface of the base film, measured perpendicular to the top surface of the unfolded base film.

The term "intercushion film" refers to the portion of flexible film located between and connecting two adjacent cushions. Accordingly, the length of the intercushion film between two adjacent cushions is typically the same length as the cushion distance between these two cushions.

The "cushion length" of a cushion is defined as the longest distance passing through the interior of the cushion (made up by the cushioning material), wherein the distance is measured parallel to the vertical grid lines. The distance is thus measured in a plane parallel to the top surface of the unfolded base film. Typically, the distance is measured in or just above (e.g. 0.5 cm above) the plane of the top surface of the base film.

The "cushion width" of a cushion is defined as the longest distance passing through the interior of the cushion (made up by the cushioning material), wherein the distance is measured parallel to the horizontal grid lines. The distance is thus measured in a plane parallel to the top surface of the unfolded base film. Typically, the distance is measured in or just above (e.g. 0.5 cm above) the plane of the top surface of the base film.

The cushion height, length and width are measured with the cushioning sheet in unfolded state, unless specifically indicated otherwise.

The term "adjacent" as used herein refers to two cushions that are positioned on adjacent grid points.

The term "horizontally adjacent" as used herein refers to a cushion being adjacent to another cushion in a direction parallel to the horizontal grid lines. The term "vertically adjacent" as used herein refers to a cushion being adjacent to another cushion in a direction parallel to the vertical grid lines. For example, the at least one fold base cushion and its first cushion are either horizontally or vertically adjacent. In case they are horizontally adjacent, the at least one fold base cushion and its second cushion are vertically adjacent. In case they are vertically adjacent, the at least one fold base cushion and its second cushion are horizontally adjacent.

The term "inside corner" refers to a three-dimensional corner formed by a bottom surface (provided by the fold base cushion) and two intersecting walls (formed by the first and second adjacent cushion). The angle between the intersecting wall may be in the range of 80-100°, preferably 85-95° C., even more preferably about 90°. An object can be placed in the inside corner for protection.

The cushioning sheet of the invention comprises (and preferably consists of) a base film, a plurality of cushions and optionally a cover film.

A cushion comprises or is made of cushioning material. Preferably, the shape of the cushioning material corresponds to the shape of the cushion as described in detail below. The cushioning material may be solid or hollow. In a preferred embodiment, the cushioning material makes up the entire cushion. In another embodiment, the cushioning material makes up the majority of the cushion, typically more than 80 wt. %, for example more than 90 wt. % of the material.

The cushioning sheet may further comprise a cover film. Such a cover film may cover at least part or all of the outer surface of the cushioning material, either by itself or together with the base film. The materials that can be used for the cover film may be the same as described below for the base film. The base film may be made of the same material as the cover film, but can also be made of a different material. For example, both the base film and the cover film may be made of polymer material, such as PLA based material.

In a preferred embodiment, the cushion comprises at least one cover film and a cushioning material (typically a fiber bundle), wherein the cushioning material is enclosed between the base film and the at least one cover film. In this embodiment, the cushioning material makes up the interior of the cushion. Part of the base film and part of the at least cover film may form a flexible envelope or "pillowcase" (exterior of the cushion), wherein the cushioning material is stuffed. The cushioning material in this embodiment can be a fiber bundle or an expanded plastic, such as PLA.

Alternatively, the cushion may consist of a single piece of shaped cushioning material. The shape of the shaped cushioning material corresponds to the shape of the cushion as described in detail below. A cushion may also consist of multiple pieces of shaped cushioning material. In this case, the different pieces together will make up the shape of the cushion. A shaped cushioning material may be solid or hollow. Preferably at least one (more preferably each) of the plurality of cushions consists of a single or multiple pieces of shaped cushioning material.

The cushion is located on the top surface of the base film. The cushion is fixed (e.g. attached) to the base film. In particular, the bottom surface of the cushion may be fixed to the top surface of the base film. For example, the cushion and base film may be fixed to each other simply because they are one and the same material or structure. Such a structure may be prepared in one step as described for the method of the invention further below. The cushion may also be fixed to the base film due to the cushion being attached to the base film by any suitable means. Means for attaching a cushion to the flexible base film are discussed further below with respect to the method of the invention.

The flexible base film of the cushioning sheet is generally flat. The cushions lie on top of the base film. In particular, the cushions are fixed to the top surface of the base film. The cushioning material is typically fixed (e.g. attached) to the base film at their base. Two cushions are connected to each other by the base film (and possibly the cover film if present). Since the base film is flexible, the different cushions can be folded along the interconnecting portions of the base film.

The cushioning sheet is biodegradable, which means that the sheet is constructed from biodegradable materials, preferably compostable materials. Preferably, each material present in the cushioning sheet is also compostable. A compostable material can be degraded by micro-organisms. Typically, a compostable material is capable of being degraded by microorganism for at least 50%, preferably 70%, more preferably 90% within 52 weeks, preferably 26 weeks, even more preferably within 12 weeks. Each of the base film, cover film and cushioning material are biodegradable, and preferably also compostable.

The cushioning material may be a fiber material, such as cardboard, fiberboard, wood fibers or natural fibers from plant or animal sources. The fiber material may be compressed. Compressing can be advantageous in view of obtaining the desired shape of the cushion and/or for shock-absorbing properties.

The cushioning material may also be a material comprising fiber material. In this case, the cushioning material may be a waste material. Such waste material can then be upcycled as cushioning material.

The cushioning material may also be a compressed fiber bundle. The compressed fiber bundle is a bundle comprising fibers, which fibers have been compressed, for example during or prior to enclosing the fibers between the base film and the cover film. The fibers may in particular be natural fibers. The natural fibers may be from plant or animal sources. Suitable natural fibers from plant source may be stalk fibers (such as plant pieces, straw, wood or wood pulp) and bast fibers (such as cotton, flax, jute, hemp). Suitable natural fibers from animal sources are wool, hair, silk fibers and feathers. In a preferred embodiment, natural fibers originate from waste material, such as dried plant fibers.

The fiber bundle may only comprise fibers. However, other components than fiber may be present in the bundle. For example, structuring agents may be present, to provide the fibers with an enhanced structure, e.g. enhanced strength. For example, an adhesive may be present in order to keep the bundles together. Also, certain fungi may be grown through the fibers to provide them with more strength. Preferably, the fiber bundle comprises at least 40 wt. % fibers, more preferably 60 wt. % fibers, even more preferably at least 80 wt. % fibers, even more preferably at least 90 wt. % fibers. The remainder of the material present in the fiber bundle is non-fiber material, e.g. micro-organisms or sand.

The cushioning material may also be or comprise a solid or foamed polymer or a material based thereon. For example, the polymer may be an extruded or expanded polymer or polymer foam. The polymer may be selected from the group consisting of polylactic acid (PLA), starch-based polymers, cellulose-based polymers, biodegradable polyesters and biodegradable biopolymers and blends thereof. Preferably, an expanded polymer, in particular expanded PLA is used as the polymer. The cushion may or may not comprise fiber material such as a fiber bundle. A material based on a certain polymer comprises at least 50 wt. %, typically at least 70 wt. %, more typically at least 90 wt. % of that polymer.

The density of the cushions in the cushioning sheet is not particularly critical and may be in the range of 10 kg/m$^3$ and 600 kg/m$^3$, preferably 20-500 kg/m$^3$. The particular density depends on the application of cushioning sheet, for example the type of object that the sheet is meant to protect. In case the cushioning material comprises or consists of expanded polymer, the density of the cushions may be 10-100 kg/m$^3$, preferably 10-50 kg/m$^3$, more preferably 15-40 kg/m$^3$.

The base film (and/or cover film if present) may for example be composed of a material selected from the group consisting of starch, cellulose, biopolymers, biodegradable polyesters and blends thereof. The base film (and/or cover film if present) is preferably made of a material that is both flexible and strong, in particular with respect to tearing. The base film (and/or cover film if present) may be a biodegradable plastic, for example a biodegradable polymer film. However, other materials can also be used, such as paper. Also, thicker films may be used, provided they are flexible. For example, an expanded polymer or polymer foam layer may be suitably used as a base film. Such a thick flexible film may also be referred to as a flexible base layer.

The flexible base film is preferably a plastic, in particular a biodegradable plastic. Suitable plastics are for example starch-based plastics, cellulose-based plastics, polylactic acid plastics, biodegradable polyesters and biodegradable biopolymers. Accordingly, the base film (and/or cover film if present) may be a plastic film, wherein the plastic is selected from the group of starch, cellulose, polylactic acid, biodegradable polyesters, biodegradable biopolymers and blends thereof. An example of a suitable blend is polycaprolactone. The plastics are preferably thermoplastic. This allows the plastic to be melted together, which is desirable in view of the preparation method of the cushioning sheets.

The thickness of the base film may vary widely and is dependent on the type of material used. Generally, it lies in the range of 10 μm to 50 mm. The base film (and/or cover film if present) may have a thickness of 10-200 μm, preferably 25-120 μm, more preferably 40-70 μm. Such a thin thickness is especially suitably for polymer films. A thin thickness provides flexibility to the film and is advantageous from an economic perspective. The thickness given in the above ranges generally also provides for sufficient strength, such that the cushions will not tear during use. A thickness of less than 10 μm may also be suitably used, but depending on the type of film used it may increase the risk of tearing. In case the base film is made of expanded polymer or polymer foam, the thickness of the base film is not particularly critical and depends on the size of the cushioning sheet. For example, such films can have a thickness of 1-50 mm, such as 2-25 mm or 3-10 mm.

Each cushion is positioned on a grid point of the rectangular grid pattern. The cushion is considered to be positioned on a grid point if any part of the cushion lies on the grid point. Preferably though, the center of the base surface of each cushion lies on the grid point. The base surface of a cushion is the surface in the plane of the base film.

In a preferred embodiment, there is no cushion located on the grid point diagonal of a fold base cushion and adjacent to the first and second adjacent cushions, as the presence of a cushion on this grid point may interfere with the folding of an inside corner.

As already stated above, the cushioning sheet can be folded into an inside corner. In order to be able to do this, the cushioning sheet needs at least one fold base cushion with suitable cushion distances between its first and second adjacent cushion, as well as suitable cushion heights for these three cushions. These can be best expressed relative to each other and the cushion widths and lengths. Below, a number of preferred ratios for different cushion distances and cushion heights are given.

For the first folding step (folding the adjacent cushion on top of the fold base cushion), it is important that the height of the first adjacent cushion is small enough that there is still sufficient room for an object to be placed on the top surface of the fold base cushion after the folding step. Furthermore, the distance between the cushions should be about the same length and/or width as the cushion height of the first adjacent cushion, such that the intercushion film can be tightly folded around the side of the fold base cushion. Accordingly, the sheet fulfills at least one, but preferably all of the following ratios.

In case the first adjacent cushion is a cushion vertically adjacent to the at least one fold base cushion, the ratio between the cushion height of the first adjacent cushion and the cushion length of the fold base cushion is typically smaller than 1, preferably between 0.1 and 0.9, more preferably between 0.2 and 0.8, more preferably between 0.3 and 0.7, more preferably between 0.4 and 0.65. In case the first adjacent cushion is a cushion horizontally adjacent to the at least one fold base cushion, the ratio between the cushion height of the first adjacent cushion and the cushion width of the fold base cushion is typically smaller than 1, preferably between 0.1 and 0.9, more preferably between 0.2 and 0.8, more preferably between 0.3 and 0.7, more preferably between 0.4 and 0.65. Accordingly, when the side surface of the first adjacent cushion is placed on the top surface of the fold base cushion, there is a sufficient room on the top surface of the fold base cushion for an object (or a part thereof) to be placed thereon. Also, minimum height of the first adjacent cushion described above contributes to this cushion slipping back off the top surface of the fold base cushion.

Furthermore, the ratio between the cushion distance between the at least one fold base cushion and its first adjacent cushion and the cushion height of the at least one fold base cushion is typically between 0.5 and 1.5, preferably between 0.9 and 1.3, more preferably between 0.95 and 1.2 more preferably between 1 and 1.1. Accordingly, the portion of flexible film between these two cushions is about the same size as the height of the at least one fold base cushion. Thus, the portion of flexible film is large enough that the first adjacent cushion can be placed on top the fold base cushion, and small enough that the two cushions can be tightly folded against each other, which is important for the sturdiness of the inside corner to be folded.

For the second folding step (folding the adjacent cushion upright onto the intercushion film), it is important that the height of the fold base cushion is small enough that the second adjacent cushion when standing upright is higher than the fold base cushion. Furthermore, the distance between the cushions should be about the same length and/or width as the cushion height of the second adjacent cushion, such that the second adjacent cushion can fit onto the intercushion film when folded into an upright position. Accordingly, the sheet fulfills at least one, but preferably all of the following ratios.

In case the second adjacent cushion is a cushion vertically adjacent to the at least one fold base cushion, the ratio between the cushion height of the fold base cushion and the cushion length of the second adjacent cushion is typically smaller than 1, preferably between 0.1 and 0.9, preferably between 0.2 and 0.8, more preferably between 0.3 and 0.7, more preferably between 0.4 and 0.65. In case the second adjacent cushion is a cushion horizontally adjacent to the at least one fold base cushion, the ratio between the cushion height of the fold base cushion and the cushion width of the second adjacent cushion is typically smaller than 1, preferably between 0.1 and 0.9, preferably between 0.2 and 0.8, more preferably between 0.3 and 0.7, more preferably between 0.4 and 0.65. Accordingly, when the second adjacent cushion is folded onto the portion of flexible film, the second adjacent cushion standing upright will be higher than the cushion height of the fold base cushion, such that it forms a sufficiently high wall around the top surface of the fold base cushion. Also, the height is large enough that the second adjacent cushion does not slip onto the top surface of the fold base cushion.

Furthermore, the ratio between the cushion distance between the at least one fold base cushion and its second adjacent cushion and the cushion height of the second adjacent cushion is typically between 0.5 and 1.5, preferably between 0.9 and 1.3, more preferably between 0.95 and 1.2 more preferably between 1 and 1.1. Thus, the cushion distance is about the same size as the height. Accordingly, the second adjacent cushion can be folded sufficiently tight onto the portion of flexible film between the at least one fold base cushion its second adjacent cushion. A sufficiently tight fit is important for the sturdiness of the inside corner to be folded. Since the cushions can often be slightly compressed when folding, the ratio may be higher than 1.

As explained above, the cushioning sheet has at least one fold base cushion such that the sheet can be folded into an inside corner using this cushion as a base. However, in a preferred embodiment, the cushioning sheet comprises more than one fold base cushion. This provides more locations at which the sheet can be folded into an inside corner. This provides the cushioning sheet with more flexibility in its use, for example with respect to the position of the corner or by folding multiple corners.

Accordingly, the cushion distance and cushion height needed to fold the sheet into an inside corner preferably applies to more than one fold base cushion and its first and second adjacent cushion. Preferably, these apply to at least half, preferably at least 90%, more preferably all of the fold base cushions and their respective first and second adjacent cushions present in the cushioning sheet. Also, the above ratios for the first and second folding step apply to at least half, preferably to at least 90%, more preferably to all of the fold base cushions and their respective first and second adjacent cushions present in the cushioning sheet.

Preferably, any fold base cushion in the cushioning sheet can be used to fold the sheet into an inside corner. This object is for example achieved when any two adjacent cushions in the cushioning sheet are capable of being folded according to the first folding step. This object is also achieved when any two adjacent cushions in the cushioning sheet are capable of being folded according to the second folding step. The ratio between the cushion height of any of the cushions and the cushion length of a cushion adjacent to it is typically between 0.1 and 0.9, preferably between 0.2 and 0.8, more preferably between 0.3 and 0.7, more preferably between 0.4 and 0.65. The ratio between the cushion height of any of the cushions and the cushion width of the cushion adjacent to it is typically between 0.1 and 0.9, preferably between 0.2 and 0.8, more preferably between 0.3 and 0.7, more preferably between 0.4 and 0.65. The ratio between the cushion distance between any two adjacent cushions in a vertical cushion row and the cushion height of at least one (but preferably both) of these two adjacent cushions is typically between 0.5 and 1.5, preferably between 0.9 and 1.3, more preferably between 0.95 and 1.2 more preferably between 1 and 1.1. The ratio between the cushion distance between any two adjacent cushions in a horizontal cushion row and the cushion height of at least one of these two adjacent cushions is typically between 0.5 and 1.5, preferably between 0.9 and 1.3, more preferably between 0.95 and 1.2 more preferably between 1 and 1.1.

Generally, when folding two adjacent cushions, the portion of flexible film located between and connecting the two adjacent cushions (intercushion film) is preferably folded tightly along the surface of one of the adjacent cushions. Thus, a sturdy and solid inside corner can be formed. In order to be able to tightly fold the intercushion film along one of the two adjacent cushions, it is important that a suitable ratio between the cushion distance and cushion height is selected. As also mentioned above, this ratio preferably lies between 0.9 and 1.3, more preferably between 0.95 and 1.2 more preferably between 1 and 1.1. Thus, they are about the same, such that the intercushion film can be covered for a substantial part (e.g. more than 50% of its surface) by the side surface of one of the adjacent cushions.

A further advantage of the intercushion film is that different cushions can be pressed together if necessary, thereby forming a continuous solid protective wall.

The shape of the cushions is not particularly critical, provided that they are capable of folding according to the first and second folding step if necessary. The cushions preferably have a rectangular cuboid shape (e.g. a cube) or a dome shape. Any corners and/or edges of the rectangular cuboid or dome may be rounded. In case the cushions are rounded, the side surface and top surface of the cushion may sometimes not be very distinct from each other. In this case, the top surface of a cushion may be considered to have a size equal to the bottom surface of the cushion. The bottom surface is the area of the cushion that lies in the plane of the base film. The top surface is the surface that lies furthest away from (in particular opposite to) the bottom surface, with the side surface of the cushion lying in between the top and bottom surface. The cushions may also have a cylindrical shape, e.g. a circular or elliptic cylinder. In this case, the circular or ellipitic surfaces will form the bottom and top surfaces of the cushion.

The size of the cushions is not critical. Typically, the cushion height is 1-20 cm, preferably 2-10 cm, e.g. 3-7 cm. Suitable heights are at least 3 cm or at least 4 cm. By not choosing the minimum height too low, there is sufficient room for the object to lie when the sheet is folded into an inside corner. The cushion distance between any two adjacent cushions may be chosen within the same ranges as mentioned above for the cushion height. In a preferred embodiment, the cushion length and cushion width of the cushions are about the same. The cushion width and length are typically larger than the cushion height of a cushion. The above ratios can be used to obtain a more accurate value for the width and length of the cushions.

The cushioning sheet of the invention must comprise a minimum of three cushions in order to be able to fold an inside corner. However, the cushioning sheet preferably comprises at least four cushions, more preferably six cushions, for example at least 12 cushions. The shape of the cushioning sheets is not critical and may be irregular, for example an L-shape.

Preferably, the cushions are of similar shape and size. This is preferred, because in this way they can easily be prepared using the moulding method described below. Accordingly, when in the description above or below the cushion height, width, length or distance is defined for a single cushion or for the at least one cushion, such a value preferably applies to at least 90% of the cushions, more preferably to each cushion in the cushion sheet.

In a preferred embodiment, at least part of the cushions are connected to each other by a portion of base film (in particular, the intercushion film) that comprises a tear line for facilitating the removal of cushions from the cushioning sheet. An example of a suitable tear line is a line of perforated holes. A suitable tear line may for example be parallel to the grid lines.

The invention is further directed to a method for protecting an object with the cushioning sheet of the invention, for example by wrapping the sheet around the object or by folding the sheet in the specific inside corner described above. The object and one or more cushioning sheets may for this purpose be placed in a container, for example for transportation of a container. The cushioning sheet forms a protective boundary between the inside of the container and the object. When folding the inside corner, an object can rest on the part of the top surface of the fold base cushion that is not covered by one of its adjacent cushions. In particular, an outside corner can be protected using the folded inside corner. Also, the corners can be suitably used to immobilize objects.

The invention is further directed to methods for preparing the cushioning sheet of the invention.

A first method with which the cushioning sheet of the invention may be prepared comprises the steps of
provoking a mould comprising a plurality of cavities for shaping the plurality of cushions;
covering the cavity surfaces with at least one flexible cover film;
filling the film covered cavities with fiber material;
optionally pressing the fiber into the cavities, preferably using a pressure between 0 and 12, for example between 1 and 7 bar;
providing the top surface of the mould with at least one flexible base film; and
closing the cavities filled with fiber material by attaching the flexible base film to the at least one flexible cover film, preferably by melting the films together.

The shape and size of the cavities should be chosen similar to the cushions they are intended to shape.

The material of the flexible cover film, flexible base film and fiber material is as described above for the cushioning sheet. If necessary, the cavity may be filled with additional material besides fibers as described above.

Before covering the cavity surfaces with the cover film, the cover film may be pretreated in order to make the covering step more easy. For example, the cover film may be preheated and/or preshaped.

Filling may be conducted using a dosage tube, with which the right amount of filling is provided per cavity. The cavity may also be filled with a preshaped and/or prepressed cushion.

After filling, the fiber can be pressed into the cavities if necessary.

The top surface may be closed using one cover film, but can also be closed using multiple cover films. It is generally difficult to cover the inside surface of multiple cavities with only one cover film. Preferably, either one cover film is used per cavity row of the mould, or one cover film per single cavity of the mould is used.

The cavities filled with fiber material are closed by attaching the flexible base film with the at least one flexible cover film. Thus, the fiber material is enclosed in between the base film and the cover film. Accordingly, in each cavity a fiber bundle is enclosed. The fibers in the different cavities are preferably not in contact with each other after their enclosure. Preferably, there is no opening in the cushion from which fiber material can leave the cushion.

Closing the cavities is preferably done by melting the at least one cover film to the base film. Melting is a suitable method in case the films are made of thermoplastic materials, which can be easily melted to each other by heating. Nevertheless, it is also possible to attach the base film to the at least one cover films using different methods, for example by gluing with a suitable adhesive.

The cushion sheet can be removed from the mould.

A second method with which the cushioning sheet of the invention may be prepared is a method wherein the cushioning sheet is formed in a mold. In the mold, the base film and the cushions may be formed simultaneously in a single molding step. The cushioning sheet may be formed in the mold in one single piece, comprising both the base film and cushions. The shape of the mold cavity will in such a case correspond to the desired final shape of the cushioning sheet. The method may comprise the step of providing a polymer solution in the mold cavity and hardening the polymer solution to obtain the cushioning sheet.

A third method with which the cushioning sheet of the invention may be prepared providing a base film and attaching one or more cushions to the base film.

The cushions can be attached to the base film by any suitable means. In case the flexible base film or the exterior of the cushion or both are made of a thermoplastic material, the cushion is preferably attached to the flexible base film by melting. In this embodiment, the thermoplastic film or thermoplastic exterior of the cushion is heated at the position at which the connection between the cushion and base film is to be formed. The thermoplastic material will soften during heating. Subsequently, the cushion and base film are pressed together to attach the cushion to the base film, effectively using the softened thermoplastic material as adhesive. Upon cooling, the thermoplastic material will solidify and a bond will form between the cushion and the base film. In this embodiment, the thermoplastic material thus effectively acts as a hot melt adhesive.

The cushion may also be attached to the base film by means of an adhesive, glue or tape. The cushion may also be attached to the base film by mechanical means, such as a mechanical fastener, e.g. by one or more (biodegradable) screws, pins or nails.

The means described above generally provide a sufficiently strong bond between the base film and the cushions. During packaging, when the sheet is in folded form, the packaged product will be mainly in contact with the top side of the cushions. In such a case, the forces typically applied to the side of the cushions during packaging is relatively low. Accordingly, the bond between the base film and the cushions does not need to be particularly strong.

Using the above methods, it is easy to produce the cushioning sheets of the invention in a practical and standardized way. An advantage of these methods is that it is very easy to make a sheet with cushions of a standardized size. This makes it possible to practically easily adapt the cushioning sheet to the need of the packaging. For example, in order to adapt to certain container sizes and/or certain objects, it is only necessary to use (and if necessary produce) a mold with the required size and shape, after which many packaging sheets of standardized size can be made using the first method of the invention.

The materials of the flexible cover film, flexible base film and cushions to be used in the methods of the invention are as described above for the cushioning sheet.

In case a cushioning sheet of a specific form is required, the method of the invention may further comprise (e.g. after the closing step of the first method of the invention) the step of removing part of the cushions from the cushioning sheet, for example by cutting or tearing. In this way, irregularly shaped (e.g. non-rectangular) sheets can be produced if necessary. To facilitate the removal of cushions, the inter-cushion film may be provided with a tear line.

It is further possible to combine two or more cushioning sheets into one larger cushioning sheet. For example, the base film of two cushioning sheets can be melted together by heating if the base film is made from thermoplastic material. Thus, an even larger variety of shapes and sizes can be obtained.

The invention claimed is:

1. A foldable and biodegradable cushioning sheet comprising a plurality of cushions, which sheet comprises
   a flexible base film; and
   a plurality of cushions located on the top surface of the flexible base film; and
   wherein the cushions are distributed over the top surface of the base film in a rectangular grid pattern of horizontal and vertical grid lines, with each cushion positioned on a grid point, wherein a fold base cushion is defined as a cushion that has a first adjacent cushion and a second adjacent cushion, which first and second cushion do not lie on the same grid line,
   wherein the cushion distance between at least one fold base cushion and its first adjacent cushion is such that the first adjacent cushion can be placed on top of said at least one fold base cushion by folding the portion of film located between these cushions upward along the side surface of said at least one fold base cushion and placing the side surface of the first adjacent cushion onto the top surface of said at least one fold base cushion, and wherein the first base cushion has a cushion height sufficiently small that its top surface is not fully covered by the side surface of the first adjacent cushion after such placing; and
   wherein the cushion distance between said at least one fold base cushion and its second adjacent cushion is such that the side surface of the second adjacent cushion can be placed on top of the portion of base film located between said at least one fold base cushion and its second adjacent cushion, wherein such placing causes the top surface of the second cushion to be contacted with the side surface of said at least one fold base cushion, and wherein said at least one fold base cushion has a cushion height sufficiently small that the top surface of the second adjacent cushion is not fully covered by the side surface of the fold base cushion after such placing.

2. The cushioning sheet according to claim 1, wherein each cushion comprises a cushioning material and a cover film, wherein the cushioning material is enclosed between the base film and said cover film.

3. The cushioning sheet according to claim 1, wherein each cushion has a cushion length and a cushion width,
   wherein the cushion length of a cushion is defined as the longest distance passing through the interior of the cushion, wherein the distance is measured parallel to the vertical grid lines; and
   wherein the cushion width of a cushion is defined as the longest distance passing through the interior of the cushion, wherein the distance is measured parallel to the horizontal grid lines; and
   wherein the ratio between the cushion height of any of the cushions and the cushion length of any cushion adjacent to it is smaller than 1; and
   wherein the ratio between the cushion height of any of the cushions and the cushion width of any cushion adjacent to it is smaller than 1; and
   wherein the ratio between the cushion distance between any two adjacent cushions in a vertical cushion row and the cushion height of any of said two cushions is between 0.5 and 1.5; and
   wherein the ratio between the cushion distance between any two adjacent cushions in a horizontal cushion row and the cushion height of any of said two cushions is between 0.5 and 1.5.

4. The cushioning sheet according to claim 3
   wherein the ratio between the cushion height of any of the cushions and the cushion length of any cushion adjacent to it is between 0.1 and 0.9; and
   wherein the ratio between the cushion height of any of the cushions and the cushion width of any cushion adjacent to it is between 0.1 and 0.9; and
   wherein the ratio between the cushion distance between any two adjacent cushions in a vertical cushion row and the cushion height of any of said two cushions is between 0.9 and 1.3; and
   wherein the ratio between the cushion distance between any two adjacent cushions in a horizontal cushion row and the cushion height of any of said two cushions is between 0.9 and 1.3.

5. The cushioning sheet according to claim 3
   wherein the ratio between the cushion height of any of the cushions and the cushion length of any cushion adjacent to it is between 0.2 and 0.8; and
   wherein the ratio between the cushion height of any of the cushions and the cushion width of any cushion adjacent to it is between 0.2 and 0.8; and
   wherein the ratio between the cushion distance between any two adjacent cushions in a vertical cushion row and the cushion height of any of said two cushions is between 0.95 and 1.2; and
   wherein the ratio between the cushion distance between any two adjacent cushions in a horizontal cushion row and the cushion height of any of said two cushions is between 0.9 and 1.2.

6. The cushioning sheet according to claim 3
   wherein the ratio between the cushion height of any of the cushions and the cushion length of any cushion adjacent to it is between 0.3 and 0.7; and
   wherein the ratio between the cushion height of any of the cushions and the cushion width of any cushion adjacent to it is between 0.3 and 0.7; and
   wherein the ratio between the cushion distance between any two adjacent cushions in a vertical cushion row and the cushion height of any of said two cushions is between 1 and 1.1; and
   wherein the ratio between the cushion distance between any two adjacent cushions in a horizontal cushion row and the cushion height of any of said two cushions is between 1 and 1.1.

7. The cushioning sheet according to claim 3
   wherein the ratio between the cushion height of any of the cushions and the cushion length of any cushion adjacent to it is between 0.4 and 0.65; and
   wherein the ratio between the cushion height of any of the cushions and the cushion width of any cushion adjacent to it is between 0.4 and 0.65; and
   wherein the ratio between the cushion distance between any two adjacent cushions in a vertical cushion row and the cushion height of any of said two cushions is between 0.5 and 1.5; and wherein the ratio between the cushion distance between any two adjacent cushions in a horizontal cushion row and the cushion height of any of said two cushions is between 0.5 and 1.5.

8. The cushioning sheet according to claim 1, wherein the flexible base film is composed of a compostable plastic.

9. The cushioning sheet according to claim 1, wherein the flexible base film is composed of a plastic selected from the group of starch, cellulose, biopolymers, biodegradable polyesters and blends thereof.

10. The cushioning sheet according to claim 1, wherein the base film and, if present, the cover film have a thickness of 10-200 µm.

11. The cushioning sheet according to claim 1, wherein both the base film and the cushion are made from a material based on polylactic acid.

12. The cushioning sheet according to claim 1, wherein at least part of the cushions are connected to each other by a portion of base film that comprises a tear line for facilitating the removal of cushions from the cushioning sheet.

13. The cushioning sheet according to claim 1, wherein the sheet comprises at least six cushions, wherein the cushions are of similar shape and size.

14. The cushioning sheet according to claim 1, wherein the flexible base film is a biodegradable thermoplastic and wherein the cushioning material is a polymer foam, an extruded polymer or an expanded polymer, wherein the cushions have been attached to the base film by melting them together.

15. The cushioning sheet according to claim 14, wherein the polymer is a member selected from the group consisting of polylactic acid (PLA), starch-based polymers, cellulose-based polymers, biodegradable polyesters and biodegradable biopolymers and blends thereof.

16. The cushioning sheet according to claim 1, wherein the base film and, if present, the cover film have a thickness of 25-120 µm.

17. The cushioning sheet according to claim 1, wherein the base film and, if present, the cover film have a thickness of 40-70 µm.

* * * * *